(12) United States Patent
Kobayashi

(10) Patent No.: US 11,841,071 B2
(45) Date of Patent: Dec. 12, 2023

(54) FLAT STRAIN WAVE GEARING

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 94 days.

(21) Appl. No.: 17/630,351

(22) PCT Filed: Sep. 27, 2019

(86) PCT No.: PCT/JP2019/038184
§ 371 (c)(1),
(2) Date: Jan. 26, 2022

(87) PCT Pub. No.: WO2021/059494
PCT Pub. Date: Apr. 1, 2021

(65) Prior Publication Data
US 2022/0290752 A1    Sep. 15, 2022

(51) Int. Cl.
*F16H 49/00* (2006.01)
*F16H 55/08* (2006.01)

(52) U.S. Cl.
CPC ....... *F16H 49/001* (2013.01); *F16H 55/0833* (2013.01)

(58) Field of Classification Search
CPC ...... F16H 1/32; F16H 49/001; F16H 55/0833; F16H 2049/003
See application file for complete search history.

(56) References Cited

U.S. PATENT DOCUMENTS 2,849,897 A * 9/1958 Walma ................ G04B 13/00
74/411
3,187,605 A * 6/1965 Stiff ..................... F16H 49/001
74/640

(Continued)

FOREIGN PATENT DOCUMENTS

DE        2520368 A1 * 11/1976
DE        19938957 B4 *  8/2006  ........... F16H 49/001

(Continued)

OTHER PUBLICATIONS

International Search Report (PCT/ISA/210) with translation and Written Opinion (PCT/ISA/237) dated Nov. 5, 2019, by the Japan Patent Office as the International Searching Authority for International Application No. PCT/JP2019/038184. (6 pages).

*Primary Examiner* — Adam D Rogers
(74) *Attorney, Agent, or Firm* — BUCHANAN INGERSOLL & ROONEY PC

(57) ABSTRACT

The flat strain wave gearing is provided with an axially arranged rigid gear, flexible gear and wave generator. The flexible gear forms a flat truncated cone shape, has a tooth formation portion connected via a bellows-shaped cross-sectional diaphragm to a rigid boss which is an output shaft linking part. The flat strain wave gearing can ensure axial flexibility of the tooth formation portion, and can enable teeth of the flexible gear to mesh favorably with teeth of the rigid gear in the axial direction in each position in the tooth trace direction. Local bias of the load torque in the meshing portion in the tooth formation portion can also be suppressed.

7 Claims, 6 Drawing Sheets

(56) References Cited

U.S. PATENT DOCUMENTS

| | | | | |
|---|---|---|---|---|
| 4,742,729 | A * | 5/1988 | Cordara | ............... F16H 49/001 |
| | | | | 475/159 |
| 7,047,923 | B2 * | 5/2006 | Schafer | .................. F01L 1/356 |
| | | | | 123/90.31 |
| 9,534,681 | B2 * | 1/2017 | Ishikawa | ............... F16H 49/001 |
| 10,981,271 | B2 * | 4/2021 | Kataoka | ................. B25J 9/1025 |
| 2007/0261516 | A1 | 11/2007 | Saito | |

FOREIGN PATENT DOCUMENTS

| | | | |
|---|---|---|---|
| JP | S4869947 | A | 9/1973 |
| JP | S6040845 | A | 3/1985 |
| JP | 60132155 | A * | 7/1985 |
| JP | S60129455 | A | 7/1985 |
| JP | H04370445 | A | 12/1992 |
| JP | 2007303592 | A | 11/2007 |
| JP | 2018094679 | A | 6/2018 |
| SU | 934083 | A1 * | 6/1982 |

* cited by examiner

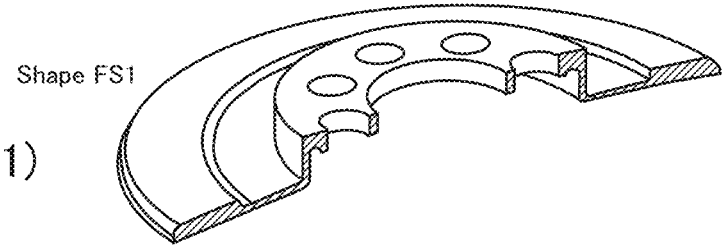
FIG. 6(A1)
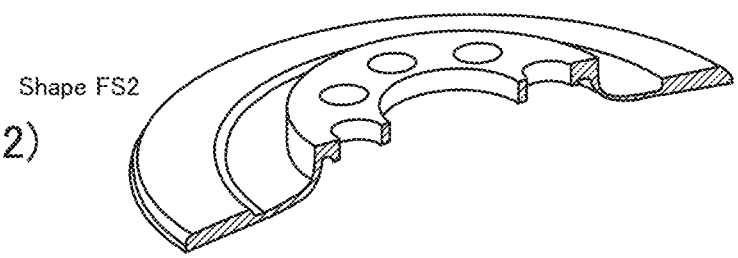
FIG. 6(A2)
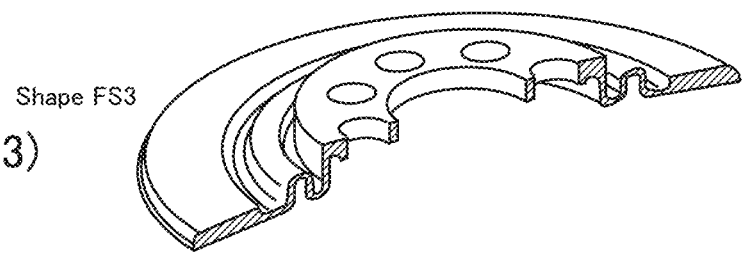
FIG. 6(A3)
FIG 6. (B)
| Shape of Diaphragm | Displacement Reaction Force | Maximum Stress | Displacement Amount | | |
|---|---|---|---|---|---|
| | | | Displacement Amount 1 | Ratio = Displacement 2 / Displacement 1 | Total of Displacement Amounts |
| Shape 1 | 1.00 | 1.00 | 1.00 | 1.5 % | 1.00 |
| Shape 2 | 2.45 | 1.27 | 1.00 | 13.1 % | 1.11 |
| Shape 3 | 1.66 | 1.03 | 1.00 | 27.3 % | 1.25 |

FLAT STRAIN WAVE GEARING

TECHNICAL FIELD

The present invention relates to a strain wave gearing, and in particular relates to a flat strain wave gearing that has a short axial length and that is configured such that a flexible gear facing a rigid gear in the axial direction is caused to flex in the axial direction and partially mesh with the rigid gear.

BACKGROUND ART

In strain wave gearings having a "cup" profile, which are the mainstream form of strain wave gearings, a flexible gear having external teeth that are parallel to the axial direction is flexed in an ellipsoidal shape by a wave generator. The flexible gear that has been flexed in the ellipsoidal shape meshes with internal teeth of a rigid gear that is disposed on the radially outer side thereof at locations on and near the long axis of the ellipsoidal shape in a state of meshing that is substantially parallel to the axial direction. Strain wave gearings having a "cup" profile are superior to those having a "pancake" profile (strain wave gearings having a "flat" profile), which have a short axial-direction length, and to those having a "short-barrel" profile, in which the axial length is reduced, in terms of torque capacity and transmission characteristics.

However, in order to leverage the characteristics of strain wave gearings having a "cup" profile, the axial length thereof must be equal to or greater than a given length. Specifically, the axial length is determined according to the tooth width of the flexible gear and the lengths of a barrel part and a diaphragm of the flexible gear, and is difficult to flatten. Employing a configuration in which the flexible gear and the rigid gear are caused to face each other in the axial direction and in which the two gears are caused to mesh in the axial direction in order to flatten such strain wave gearings is a measure that has been considered.

In the prior art, Patent Documents 1 to 4 propose strain wave gearings having configurations in which a flexible gear and a rigid gear are caused to mesh in the axial direction. For example, in the strain wave gear mechanisms disclosed in Patent Documents 1 and 2, a rigid gear and a flexible gear are caused to face each other in the axial direction, and the flexible gear is caused to flex in the axial direction and partially mesh with the rigid gear. A wave generator for flexing the flexible gear in the axial direction is provided with a configuration in which the back surface of the flexible gear is supported by a rigid cam plate in the axial direction via balls.

PRIOR-ART DOCUMENTS

Patent Documents

Patent Document 1: JP S48-69947 A
Patent Document 2: JP S60-40845 A
Patent Document 3: JP S60-129455 A
Patent Document 4: JP H04-370445 A

SUMMARY OF THE INVENTION

Problems to be Solved by the Invention

Strain wave gearings having configurations in which a rigid gear and a flexible gear are caused to face each other in the axial direction and in which the flexible gear is caused to flex in the axial direction and mesh with the rigid gear are effective in reducing axial length. However, in order to ensure torque capacity and transmission characteristics similar to those in the case of strain wave gearings having a "cup" profile, the tooth width of the flexible gear and the length of the diaphragm must be equal to or greater than a prescribed length, and to ensure a prescribed ease of flexing, a suitable meshing state must be formed between the two gears at each position in the tooth trace direction. In addition, the rigidity with which the flexible gear is supported by the wave generator in the axial direction must be improved.

In view of the foregoing, it is an object of the present invention to provide a flat strain wave gearing provided with a flexible gear that is capable of meshing with a rigid gear in the axial direction in a suitable state, and a wave generator that has high supporting rigidity.

Means of Solving the Problems

In order to achieve the above object, the flat strain wave gearing of the present invention has: a rigid gear in which first teeth are formed, at a uniform pitch in the circumferential direction, on an end surface that is orthogonal to the axial direction; a flexible gear, which faces the rigid gear in the axial direction and in which second teeth that are capable of meshing with the first teeth in the axial direction are formed at a uniform pitch in the circumferential direction; and a wave generator that causes a tooth formation portion of the flexible gear where the second teeth are formed to flex in the axial direction, the second teeth to mesh with the first teeth at a plurality of positions set apart in the circumferential direction, and the positions where the two gears mesh to move in the circumferential direction. The flexible gear is formed in a shape that follows a flat truncated-cone shape having a vertex angle of at least 165° and less than 180°, and moreover is provided with: a rigid boss; a diaphragm that has a bellows-form cross-section, the diaphragm expanding from the outer peripheral edge of the rigid boss outward and toward a direction away from the rigid gear; and a conical barrel part, which is continuous with the outer peripheral edge of the diaphragm and expands outward and toward a direction away from the rigid gear, and on which the tooth formation portion is formed.

The flat strain wave gearing of the present invention is formed in a flat truncated-cone shape having a vertex angle of at least 165° and less than 180°. The outer-peripheral-edge-side outer peripheral surface portion of the cone surface thereof is a tooth formation portion where the second teeth are formed. The tooth formation portion is connected to the rigid boss, which is an output shaft fastening part, via the diaphragm having the bellows-form cross-section. It is possible to ensure ease of axial-direction flexing of the tooth formation portion and cause the second teeth to satisfactorily mesh with the first teeth at each position in the tooth trace direction. It is also possible to suppress any local deviation in load torque of tooth meshing parts in the tooth formation portion.

In the present invention, the wave generator is provided with a rigid cam plate in which is formed a cam surface that functions as a roller raceway surface facing the inner-peripheral surface of the tooth formation portion of the conical barrel part in the axial direction, a plurality of cylindrical rollers that are mounted between the cam surface of the rigid cam plate and the inner peripheral surface of the flexible gear, and an annular retainer that retains the cylindrical rollers at uniform intervals in the circumferential direction. The circumferential-direction curved shape of the cam surface is regulated such that the axial-direction position of the cylindrical rollers rolling in the circumferential direction along the cam surface undulates a plurality of times at uniform amplitude in the axial direction while the cylindrical rollers complete one cycle along the cam surface.

The roller raceway surface is formed in a curve that is perpendicular to the axial direction, or is formed in a curve that emulates a curved shape obtained in a flexed state in which the tooth formation portion of the flexible gear is flexed in the axial direction. The retainer of the wave generator is also capable of flexing in the axial direction. The retainer is provided with flexibility such that the retainer can track axial-direction displacement of the roller raceway surface produced in association with rotation of the wave generator, axial-direction displacement of the cylindrical rollers rolling along the roller raceway surface, and axial-direction displacement of the tooth formation portion of the flexible gear that is flexed by the wave generator.

The second teeth are thereby supported at each position in the tooth trace direction from a direction that follows the axial direction. Thus, the rigidity with which the flexible gear is supported by the wave generator is high. The second teeth of the flexible gear also can form a state of meshing with the first teeth of the rigid gear in the axial direction at each position in the tooth trace direction, and the torque transmission characteristics of the second teeth can be improved.

BRIEF DESCRIPTION OF THE DRAWINGS

FIGS. 6(A1) to 6(A3) are explanatory diagrams showing flexible gears that have different diaphragm shapes, and FIG. 6(B) is a list table showing results of comparative experiments.

MODE FOR CARRYING OUT THE INVENTION

An embodiment of a flat strain wave gearing to which the present invention is applied is described below with reference to the accompanying drawings.
(Flat Strain Wave Gearing)

Figure 1A:
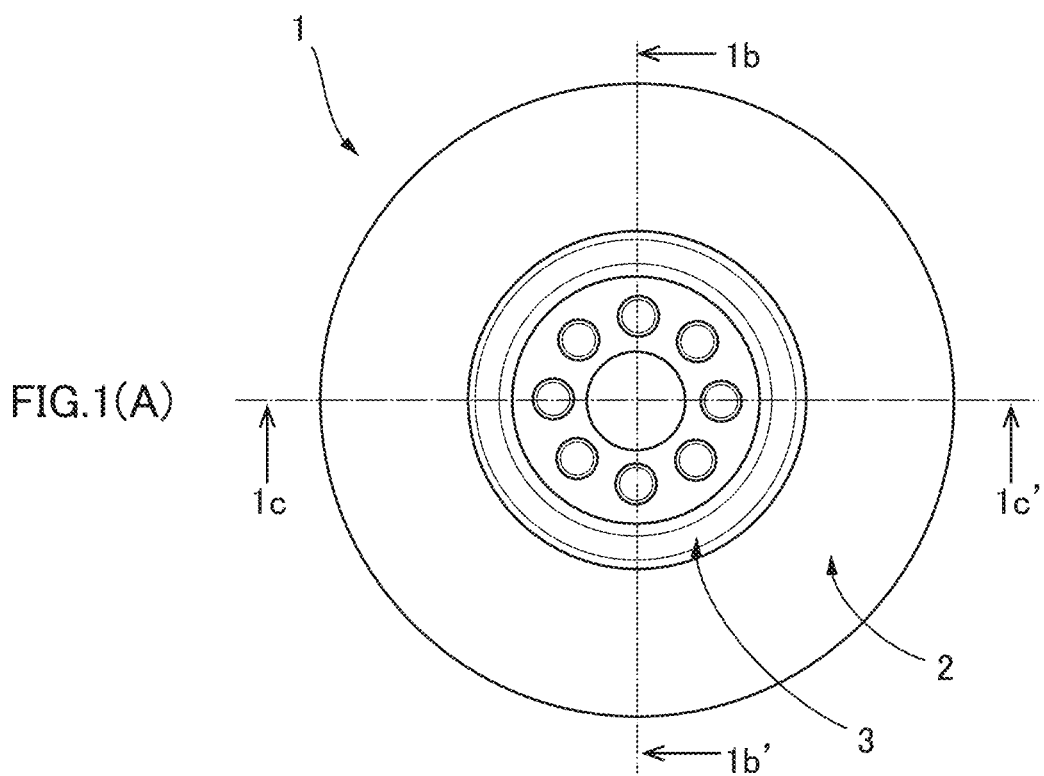
FIG. 1(A) is a schematic end-surface view of a flat strain wave gearing according to an embodiment of the present invention.
Figure 1B:
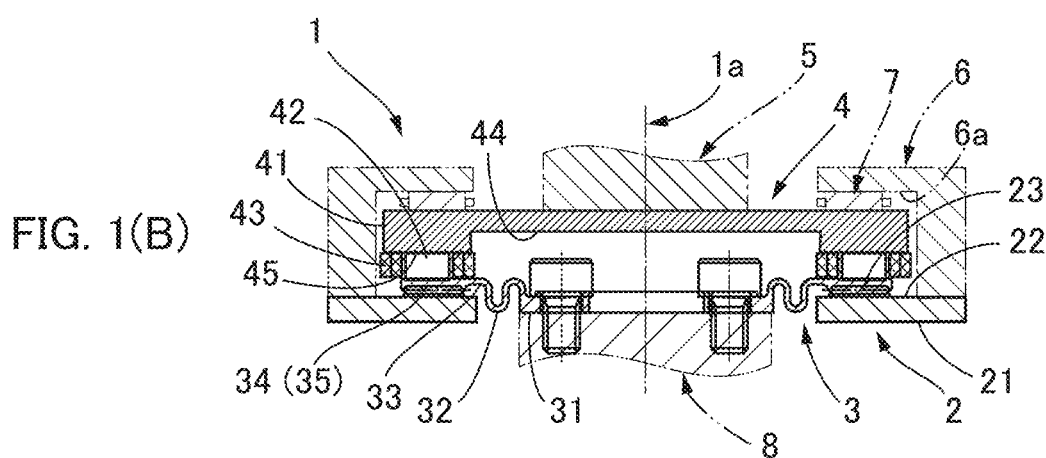
FIGS. 1(B) and 1(C) are schematic longitudinal cross-sectional views of the same.
Figure 1C:
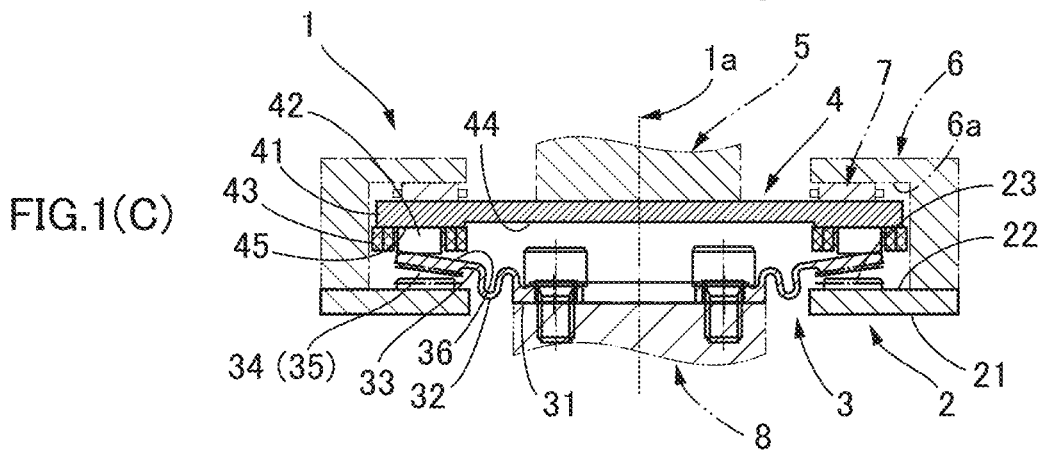

FIG. 1(A) is a schematic end-surface view of a flat strain wave gearing according to an embodiment of the present invention, FIG. 1(B) is a schematic longitudinal cross-sectional view showing a portion sectioned at a line 1$b$-1$b$' of FIG. 1(A) and FIG. 1(C) is a schematic longitudinal cross-sectional view showing a portion sectioned at a line 1$c$-1$c$' of FIG. 1(A). The flat strain wave gearing 1 is provided with a rigid gear 2, a flexible gear 3 that is formed to have a flat truncated-cone shape, and a wave generator 4. The wave generator 4 causes the flexible gear 3 to flex in the direction of a central axis 1$a$ (axial direction) and mesh with the rigid gear 2 at a plurality of positions that are set apart in the circumferential direction.

The rigid gear 2 is provided with an annular member 21 of uniform thickness, and first teeth 23 that are formed on one annular end surface 22 of the annular member 21. The annular member 21 is centered on the central axis 1$a$ and is disposed perpendicularly with respect to the central axis 1$a$. The first teeth 23 are formed on the annular end surface 22 at a uniform pitch in the circumferential direction centered on the central axis 1$a$, and the tooth trace direction of the first teeth 23 is the radial direction.

The flexible gear 3 is provided with a rigid boss 31, a diaphragm 32 having a bellows-form cross-section, a conical barrel part 33, and second teeth 35 formed on an outer-peripheral-edge-side tooth formation portion 34 of the conical barrel part 33. The second teeth 35 are formed on the conical tooth formation portion 34 at a uniform pitch in the circumferential direction centered on the central axis 1$a$. The tooth trace direction of the second teeth 35 is the generatrix direction of the conical outer peripheral surface.

The wave generator 4 is provided with a rigid cam plate 41 having a disc shape, a plurality of cylindrical rollers 42, and an annular retainer 43 that retains the cylindrical rollers 42 at uniform intervals in the circumferential direction in a state that allows rolling. The wave generator 4 causes the tooth formation portion 34 of the flexible gear 3 to flex in the axial direction and the second teeth 35 to mesh with the first teeth 23 at a plurality of positions that are set apart in the circumferential direction. The rigid cam plate 41 is centered on the central axis 1$a$ and is disposed perpendicularly with respect to the central axis 1$a$. The rigid cam plate 41 is disposed on the side of the flexible gear 3 that is opposite from the rigid gear 2 in the axial direction. An outer-peripheral-edge-side portion of an end surface 44 on the flexible-gear 3 side of the rigid cam plate 41 is a cam surface 45 of uniform width that extends in the circumferential direction. The cam surface 45 functions as a roller raceway surface for the cylindrical rollers 42 and faces a conical inner peripheral surface portion 36, which is the back surface of the tooth formation portion 34 of the flexible gear 3.

The flat strain wave gearing 1 is assembled in a mechanism subject to assembly, as shown by virtual lines in FIGS. 1(B) and 1(C). A rotary input shaft 5 is coaxially linked to the rigid cam plate 41 of the wave generator 4. The rotary input shaft 5 is, e.g., a motor rotary shaft. The rigid cam plate 41 is supported in a state that allows rotation by a cylindrical housing 6, which is a fixed-side member in the mechanism subject to assembly. For example, thrust roller bearings 7 are mounted between the back surface of the rigid cam plate 41 and an end surface 6$a$ of the housing 6 that faces the back surface, and the rigid cam plate 41 is supported by the housing 6 in the axial direction in a state that allows rotation. Furthermore, the rigid gear 2 is coaxially fixed to the housing 6. By contrast, a rotary output shaft 8 or other load-side member is coaxially linked to the rigid boss 31 of the flexible gear 3.

The rigid cam plate 41 is assembled so as to attain a state in which a prescribed pre-pressure is applied in a direction from the rotary-input-shaft 5 side toward the flexible gear 3. When the rigid cam plate 41 rotates at high speed due to the rotary input shaft 5, the tooth formation portion 34 is repeatedly displaced in the axial direction by the cam surface 45. At positions at which the tooth formation portion 34 is displaced in the axial direction by a maximum displacement amount, the second teeth 35 of the tooth formation portion 34 mesh with the first teeth 23 of the rigid gear 2 in the axial direction.

In the present example, as shown in FIG. 1(B), the tooth formation portion 34 is displaced in the axial direction by the maximum displacement amount at two positions that are set apart by 180° in the circumferential direction, and the second teeth 35 mesh with the first teeth 23 of the rigid gear 2 at these two positions. At positions obtained by rotating 90° from the aforementioned two positions, the second teeth 35 are set apart from the first teeth 23 in the axial direction, as shown in FIG. 1(C). In this instance, the difference between the numbers of first and second teeth 23, 35 is equal to 2n. For example, the number of second teeth 35 is two less than the number of first teeth 23. When the wave generator 4 makes one rotation, the rigid gear 2 and the flexible gear 3 undergo relative rotation by an angular amount corresponding to the difference between the numbers of teeth. In association with rotation of the wave generator 4, the flexible gear 3 rotates at a rotation speed that is greatly reduced in accordance with the difference between the numbers of teeth of the rigid gear 2 and the flexible gear 3. The reduced rotation is extracted from the rigid boss 31 of the flexible gear 3 by the rotary output shaft 8.

Figure 2A:
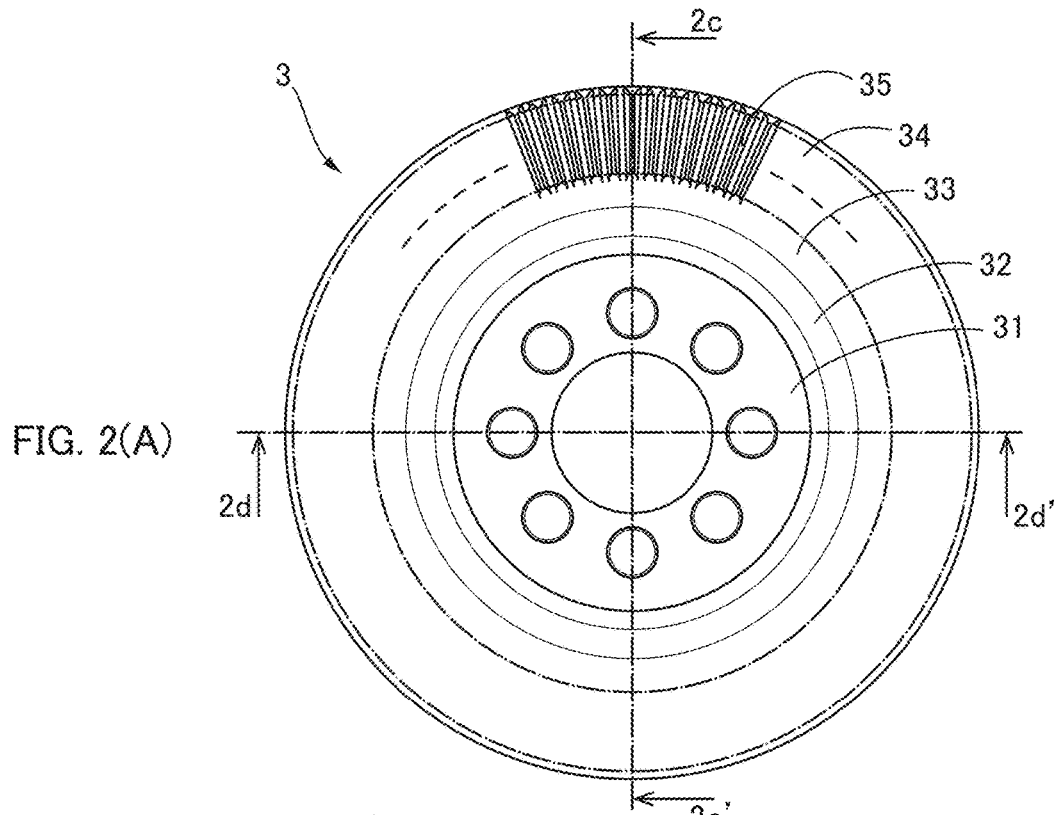
FIG. 2(A) is a plan view showing a flexible gear.
Figure 2B:
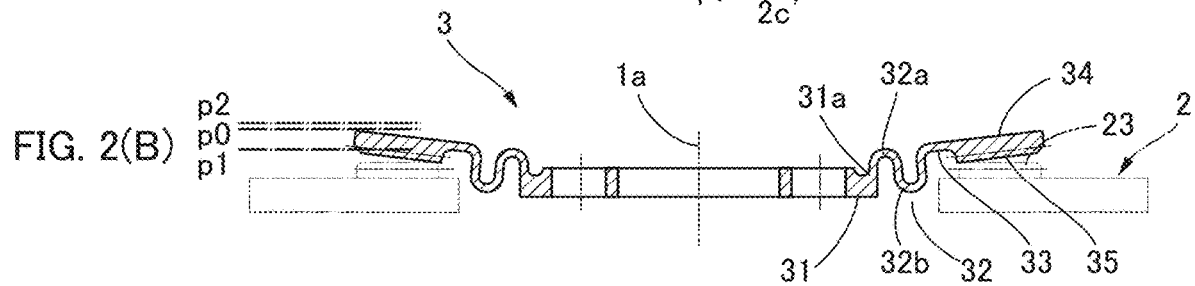
FIG. 2(B) is a cross-sectional view showing the flexible gear before the same is flexed.
Figure 2C:
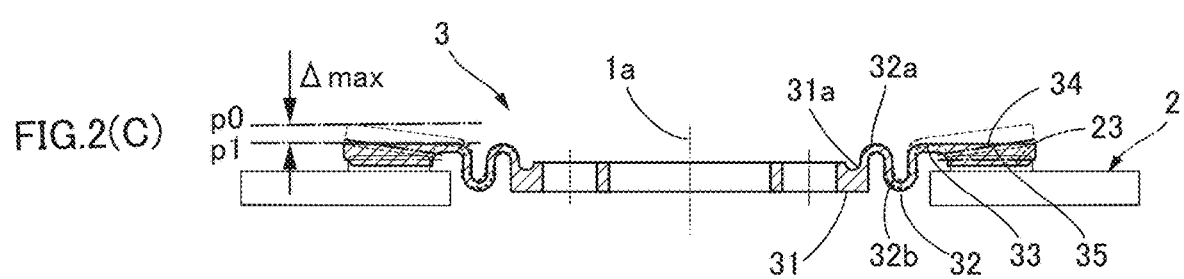
FIGS. 2(C) and 2(D) are cross-sectional views of the flexible gear in a flexed state.
Figure 2D:
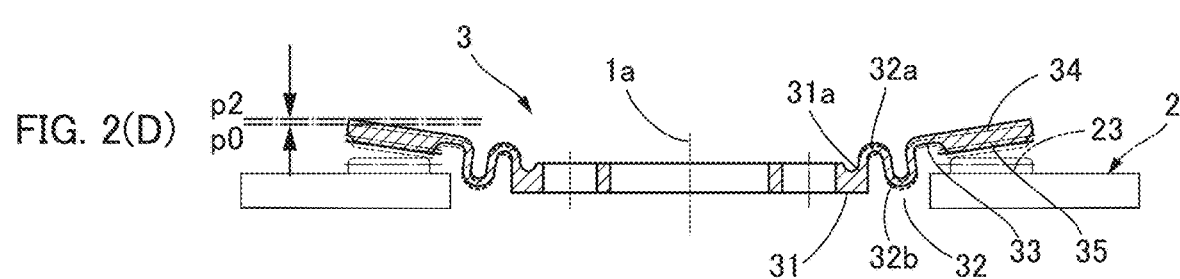

FIG. 2(A) is a plan view showing the flexible gear, FIG. 2(B) is a cross-sectional view showing the flexible gear in a state before the same is flexed, FIG. 2(C) is a cross-sectional view of the flexible gear in a flexed state at a portion that is sectioned at a line 2c-2c', and FIG. 2(D) is a cross-sectional view of the flexible gear in a flexed state at a portion that is sectioned at a line 2d-2d'.

In an initial state before being flexed, the flexible gear 3 overall has a flat truncated-cone shape centered on the central axis 1a, as shown in FIG. 2(B). For example, the flexible gear 3 has a flat truncated-cone shape having a vertex angle of at least 165° and less than 180°. The rigid boss 31 of the flexible gear 3 has a disc shape of uniform thickness. The diaphragm 32, which has a bellows-form cross-section, expands radially outward in a cone shape from the circular outer peripheral edge of the rigid boss 31. The conical barrel part 33 expands radially outward in a cone shape from the circular outer peripheral edge of the diaphragm 32. The second teeth 35 are formed on the outer peripheral surface of the tooth formation portion 34 of the conical barrel part 33 at a uniform pitch in the circumferential direction. The second teeth 35 of the flexible gear 3 can mesh with the first teeth 23 of the rigid gear 2 and face the first teeth 23 in the axial direction (the direction of the central axis 1a).

The diaphragm 32 is provided with a first curved portion 32a that protrudes in a semi-circular shape from the outer peripheral edge end of the rigid boss 31 toward one side in the axial direction, and a second curved portion 32b that is continuous with the first curved portion 32a and that protrudes in a semi-circular shape toward the other side in the axial direction. The end of the second curved portion 32b is curved radially outward and is connected to the conical barrel part 33. The cross-section of an attachment portion 31a of the rigid boss 31 attaching to the first curved portion 32a is cut out in a semi-circular shape, the plate thickness of the attachment portion gradually increasing from the diaphragm 32 side toward the rigid-boss 31 side.

In a state before being flexed by the wave generator 4, the tooth formation portion 34 of the flexible gear 3 is positioned at an axial-direction position p0 as shown in FIG. 2(B). In a state where the tooth formation portion 34 is flexed by the wave generator 4, the tooth formation portion 34 is flexed in the axial direction as shown in FIGS. 2(C) and 2(D). Specifically, the angular positions at which the tooth formation portion 34 is flexed in the axial direction by the maximum displacement amount are angular positions that are set apart by 180° in the circumferential direction, as shown in FIG. 2(C). At these angular positions, the tooth formation portion 34 of the flexible gear 3 is displaced from the initial position p0 to a position p1 at which the tooth formation portion 34 is flexed toward the rigid-gear 2 side by a maximum displacement amount Δmax. The second teeth 35 thereby mesh with the first teeth 23 of the rigid gear 2. However, at angular positions obtained by rotating 90° from the angular positions having the maximum displacement amount Δmax, the tooth formation portion 34 is located at a position p2 that is displaced by a very small amount in the opposite axial direction, as shown in FIG. 2(D). At these positions, the amount of axial-direction displacement caused by the wave generator 4 is substantially zero, and the second teeth 35 are set apart from the first teeth 23.

The inventors experimented on the flexible gear 3 with respect to, inter alia, ease of flexing when the cross-sectional shape of the diaphragm 32 is changed. One example of experimental results is described below with reference to FIGS. 6(A1)-6(A3) and 6(B). The tooth formation portion was flexed in the axial direction by a maximum displacement amount (displacement amount 1) at positions that were set apart by 180° when the following diaphragms were provided: a diaphragm (shape FS1) having a cross-sectional shape that is circularly curved outward in the radial direction from the outer peripheral edge of the rigid boss with small curvature, as shown in FIG. 6(A1); a diaphragm (shape FS2) having a cross-sectional shape that is curved with greater curvature, as shown in FIG. 6(A2); and a diaphragm (shape FS3) having the bellows-form cross-sectional shape according to the present example shown in FIG. 6(A3). The displacement reaction force, the maximum stress produced in the diaphragm, and the warping amount in the opposite axial direction (displacement amount 2) at positions obtained by rotating 90° from the positions having the maximum displacement amount were measured for each case.

The measurement results are shown in a table in FIG. 6(B). In the table, the displacement reaction force, the maximum stress, the displacement amount 1, the displacement amount 2, and the total of the displacement amounts 1 and 2 for the shape FS1 are each depicted as reference unit amounts of "1" for the purpose of comparison. From the table, it is understood that, in the flexible gear 3 provided with the diaphragm having the bellows-form cross-section of the present example (shape FS3), it is possible to maintain ease of flexing and suppress any local deviation in torque of tooth meshing parts to a greater extent than when the invention is provided with a diaphragm having another shape.

Figure 3A:
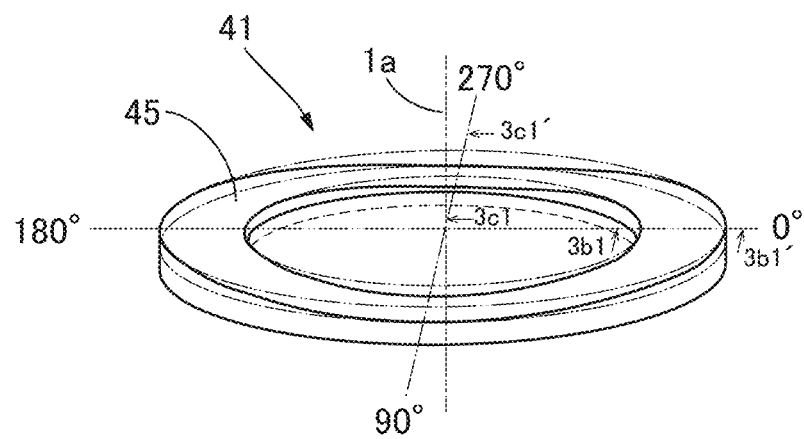
FIG. 3(A) is an explanatory diagram showing a rigid cam plate, and FIGS. 3(B1), 3(B2), 3(C1), and 3(C2) are cross-sectional views showing examples of cam surface profiles.
Figure 3:
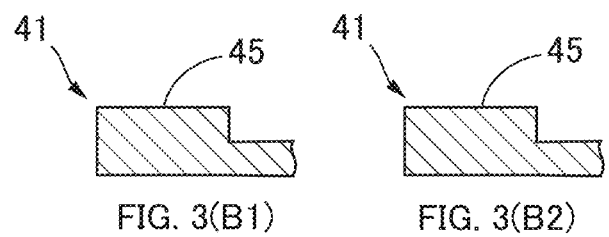
Figure 3:
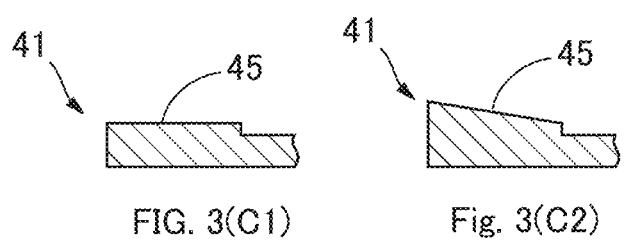

FIG. 3(A) is an explanatory diagram showing the rigid cam plate 41 of the wave generator 4, FIGS. 3(B1) and 3(B2) are cross-sectional views showing examples of cam surface profiles at a portion that is sectioned at a line 3b1-3b1', and FIGS. 3(C1) and 3(C2) are cross-sectional views showing examples of cam surface profiles at a portion that is sectioned at a line 3c1-3c1'.

The cam surface 45 formed on the rigid cam plate 41 of the wave generator 4 has a curve that is perpendicular to the central axis 1a. The cam surface 45 is formed in a curved shape toward the circumferential direction, as shown in FIG. 3(A), and is such that, for example, the axial-direction position of the surface is displaced in the form of a sine wave. Specifically, the circumferential-direction curved shape of the cam surface 45 of the rigid cam plate 41 is regulated such that the axial-direction position of the cylindrical rollers 42 rolling along the cam surface 45 undulates a plurality of times at uniform amplitude (maximum displacement amount) in the axial direction while the cylindrical rollers 42 complete one cycle along the cam surface 45. In the present example, the circumferential-direction curved shape of the cam surface 45 is set such that the cylindrical rollers 42 undulate twice in the axial direction while completing one cycle along the cam surface 45. In the cam surface 45, the angular positions at which the tooth formation portion 34 of the flexible gear 3 is flexed in the axial direction by the maximum displacement amount are the positions of 0° and 180° shown in FIG. 3(A). At the angular positions of 90° and 270°, which are set apart from the aforementioned positions by 90°, axial-direction displacement is not applied to the tooth formation portion 34.

The cam surface 45 has a curve that is perpendicular to the central axis 1a at each position in the circumferential direction, as shown in FIGS. 3(B1) and 3(C1). However, a cam surface provided with a curve that, at each position in the circumferential direction, emulates the shape of the inner peripheral surface portion 36, which is the back surface of the tooth formation portion 34 of the flexible gear 3, in an axially flexed state can also be used as the cam surface 45. The flexed state of the tooth formation portion 34 is a state in which the tooth formation portion 34 is flexed in the axial direction by the maximum displacement amount at positions that are set apart by 180° in the circumferential direction in a state where the rigid boss 31 of the flexible gear 3 is restrained so as not to move in the axial direction. For example, the cam surface 45 is an orthogonal surface that is orthogonal to the central axis 1a at the angular positions of 0° and 180° (positions with maximum displacement amount), as shown in FIG. 3(B2), and the cam surface 45 is an inclined surface that is inclined relative to a direction perpendicular to the central axis 1a at the angular positions of 90° and 270° (positions with minimum displacement amount), as shown in FIG. 3(C2). Between the orthogonal surface shown in FIG. 3(B2) and the inclined surface shown in FIG. 3(C2), the cam surface is set such that the angle of inclination gradually increases from the orthogonal surface toward the inclined surface.

Figure 4A:
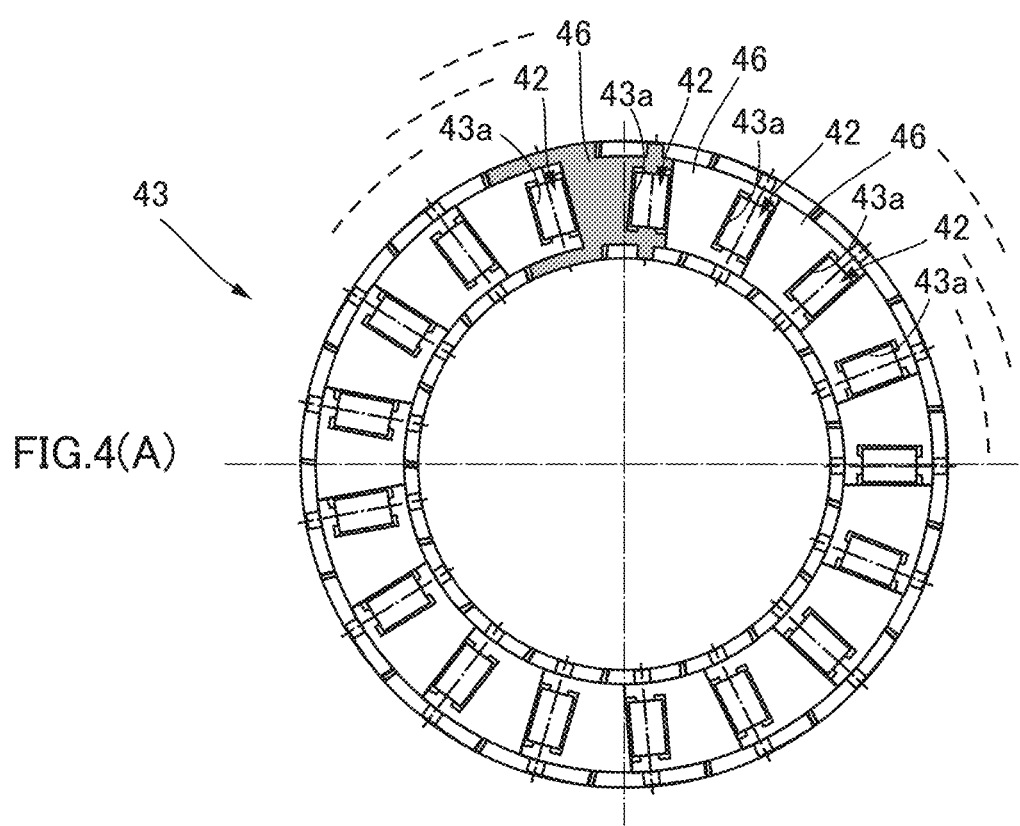
FIG. 4(A) is a plan view showing a retainer.
Figure 4B:
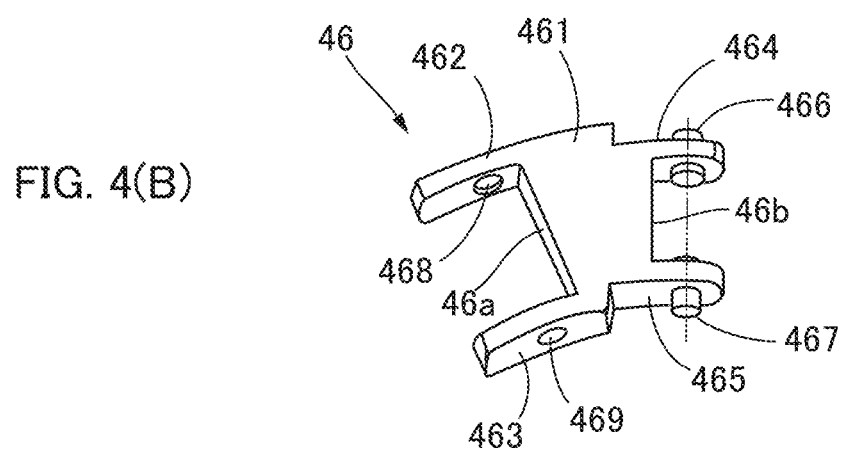
FIG. 4(B) is a perspective view showing a module of the same.

The retainer 43 of the wave generator 4 is described below with reference to FIGS. 4(A) and 4(B). FIG. 4(A) is a plan view showing the retainer 43, and FIG. 4(B) is a perspective view showing a module of the same. The retainer 43 is disposed between the cam surface 45 of the rigid cam plate 41 and the inner peripheral surface portion 36 of the flexible gear 3. The cylindrical rollers 42 are retained in pockets 43a formed in the retainer 43 in an orientation such that roller center lines face the radial direction. It is desirable for 17 or more cylindrical rollers 42 to be disposed. The cylindrical rollers 42 retained by the retainer 43 in a state that allows rolling are retained between the cam surface 45 and the inner peripheral surface portion 36 in a state in which a prescribed pre-pressure is applied from the axial direction. The retainer 43 in the present example is configured by arc-shaped modules 46 being linked in the circumferential direction.

As shown in FIG. 4(B), one module 46 is provided with a fan-shaped body plate 461 that spreads at a uniform angle, linking arc plates 462, 463 that protrude in the circumferential direction from the outer peripheral edge and the inner peripheral edge of one end surface of the body plate 461, and linking arc plates 464, 465 that protrude in the circumferential direction from the outer peripheral edge and the inner peripheral edge of the other end surface of the body plate 461. The outer peripheral surface shape of one outer-peripheral-side linking arc plate 464 is complementary to the inner peripheral surface shape of the other outer-peripheral-side linking arc plate 462. Similarly, the inner peripheral surface shape of one inner-peripheral-side linking arc plate 465 is complementary to the outer peripheral surface shape of the other inner-peripheral-side linking arc plate 463. Linking pins 466, 467 are formed integrally with the linking arc plates 464, 465 in a state of passing radially therethrough. Pin holes 468, 469 into which the linking pins 466, 467 can be fitted are formed in the other linking arc plates 462, 463.

Linking the modules 46 in the circumferential direction forms rectangular pockets 43a between end surfaces 46a, 46b of the adjacent modules 46. The cylindrical rollers 42 retained in the pockets 43a are sandwiched between the inner-side end of the linking pin 466 and the outer-side end of the linking pin 467. Each module 46 is capable of turning relative to adjacent modules 46 about a radius line passing through the centers of the linking pins 466, 467. Therefore, the retainer 43 configured by the modules 46 being linked is capable of flexing in a shape that follows the cam surface 45 curved in the form of a sine wave along the circumferential direction, also is capable of flexing so as to track axial-direction displacement of the cylindrical rollers 42 rolling along the cam surface 45, and moreover is capable of flexing so as to track displacement of the tooth formation portion of the flexible gear 3 that is flexed in a shape following the cam surface 45. An annular molded article in which fiber-reinforced rubber or another elastic material is used can also be used as the retainer 43.

(Example of Unit-Type Flat Strain Wave Gearing)

Figure 5A:
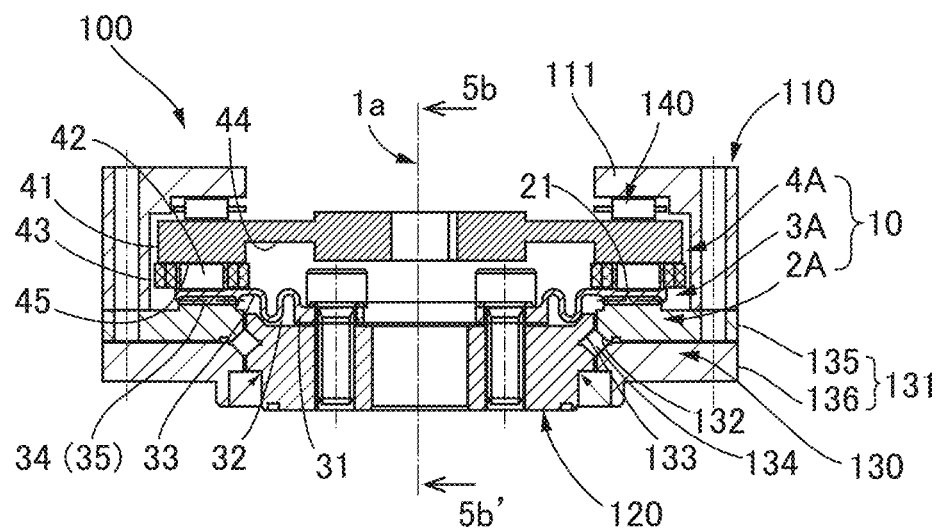
FIGS. 5(A) and 5(B) are schematic longitudinal cross-sectional views showing a unit-type flat strain wave gearing according to an embodiment of the present invention.
Figure 5B:
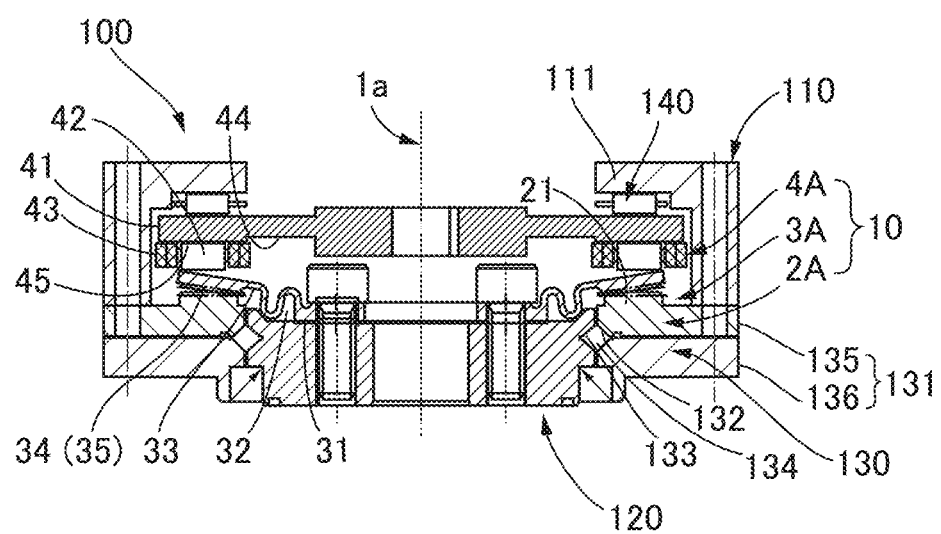

FIG. 5(A) is a schematic longitudinal cross-sectional view showing a unit-type flat strain wave gearing according to an embodiment of the present invention, and FIG. 5(B) is a schematic longitudinal cross-sectional view showing a portion sectioned at a line 5b-5b'. The unit-type flat strain wave gearing 100 has a strain wave gear mechanism 10 provided with a rigid gear 2A, a flexible gear 3A, and a wave generator 4A. The flat strain wave gearing 100 also has a cylindrical housing 110 in which the strain wave gear mechanism 10 is incorporated, a rotary output shaft 120 that is coaxially secured to the flexible gear 3A, a first bearing such as a cross-roller bearing 130, and second bearings such as thrust roller bearings 140.

The configuring elements of the strain wave gear mechanism 10 have the same configuration as those of the flat strain wave gearing 1 shown in FIGS. 1(A)-1(C), 2(A)-2(D), 3(A) and 3(B1)-3(C2). Thus, corresponding portions of the configuring elements (2A, 3A, 4A) in FIGS. 5(A) and 5(B) are designated by the same symbols, and these corresponding portions are not described here.

The cross-roller bearing 130 of the unit-type flat strain wave gearing 100 is provided with an outer ring 131 that is coaxially fastened to one end of the housing 110, an outer ring raceway surface 132 formed in the inner peripheral surface of the outer ring 131, an inner ring raceway surface 133 formed in the circular outer peripheral surface of the rotary output shaft 120, and a plurality of cylindrical rollers 134 that are mounted between the outer ring raceway surface 132 and the inner ring raceway surface 133. The inner ring of the cross-roller bearing 130 is integrated with the rotary output shaft 120.

The outer ring 131 is, e.g., a divided outer ring, and is provided with a pair of outer ring divided pieces 135, 136 that are coaxially fastened in the axial direction. In the present example, the first teeth 23 of the rigid gear 2A are formed on the end surface of the outer ring divided piece 135 that contacts the end surface of the housing 110. Specifically, the rigid gear 2A is integrated with the outer ring divided piece 135, and the two are produced as a single component. It is also possible to use a cross-roller bearing having a configuration provided with a cylindrical roller insertion hole (insertion groove) in the outer ring or the inner ring instead of using a divided outer ring 131. Due to the cross-roller bearing 130, the rigid gear 2A that is secured to the housing 110, which is a fixed-side member, and the flexible gear 3A that is secured to the rotary output shaft 120 are retained in a state that allows relative rotation.

An annular end plate portion 111 extending radially inward is formed on the other end of the housing 110. The end plate portion 111 faces the rigid cam plate 41 of the wave generator 4A in the axial direction. The thrust roller bearings 140 are mounted between the end plate portion 111 and the rigid cam plate 41.

In the unit-type flat strain wave gearing 100 having the configuration described above, for example, a motor output shaft (not shown) is coaxially linked to the rigid cam plate 41 of the wave generator 4A. There may be cases where an ultrasonic motor is applied as a linked drive motor in order to impart pre-pressure to the wave generator 4A in the axial direction.

The invention claimed is:

1. A flat strain wave gearing comprising:
a rigid gear that has an end surface perpendicular to an axial direction, and first teeth formed on the end surface at a uniform pitch in a circumferential direction;
a flexible gear that faces the rigid gear in the axial direction, and second teeth formed at a uniform pitch in the circumferential direction, the second teeth being capable of meshing with the first teeth in the axial direction; and
a wave generator that causes a tooth formation portion of the flexible gear where the second teeth are formed to flex in the axial direction, the second teeth to mesh with the first teeth at a plurality of positions set apart in the circumferential direction, and the positions where the two gears mesh to move in the circumferential direction,
wherein the flexible gear is formed in a shape that follows a flat truncated-cone shape having a vertex angle of at least 165° and less than 180°, and
wherein the flexible gear is provided with:
a rigid boss;
a diaphragm that has a bellows-form cross-section, the diaphragm expanding from an outer peripheral edge of the rigid boss outward and toward a direction away from the rigid gear; and
a conical barrel part that is continuous with an outer peripheral edge of the diaphragm and expands outward and toward a direction away from the rigid gear,
the tooth formation portion being formed on the conical barrel part,
wherein the wave generator has:
a rigid cam plate formed with a cam surface that functions as a roller raceway surface facing an inner peripheral surface of the tooth formation portion of the conical barrel part in the axial direction;
a plurality of cylindrical rollers that are mounted between the cam surface of the rigid cam plate and the inner peripheral surface of the flexible gear; and
an annular retainer that retains the cylindrical rollers at uniform intervals in the circumferential direction, and
wherein a curved shape of the cam surface in the circumferential direction is regulated such that a position in the axial direction of the cylindrical rollers, which roll in the circumferential direction on the cam surface, undulates a plurality of times at uniform amplitude in the axial direction while the cylindrical rollers complete one cycle along the cam surface.

2. The flat strain wave gearing according to claim 1, wherein the cam surface is a curved surface that is perpendicular to the axial direction.

3. The flat strain wave gearing according to claim 1, wherein
the cam surface is defined by a curve that emulates a shape of the inner peripheral surface of the tooth formation portion, the shape being obtained in a flexed state in which the tooth formation portion of the flexible gear is flexed in the axial direction, and
the flexed state of the tooth formation portion is a state in which the tooth formation portion is flexed in the axial direction by a maximum displacement amount at a plurality of positions in the circumferential direction,
where the maximum displacement amount is a displacement amount in the axial direction that is required for the second teeth of the flexible gear to mesh with the first teeth of the rigid gear.

4. The flat strain wave gearing according to claim 1, wherein the retainer of the wave generator has flexibility in the axial direction.

5. The flat strain wave gearing according to claim 4, wherein the retainer comprises a plurality of modules being linked in the circumferential direction, and
each module is linked to the modules adjacent thereto in a state being capable of turning relative to the adjacent modules about a radius line passing through a center of the retainer.

6. The flat strain wave gearing according to claim 1, further comprising:
a cylindrical housing in which the rigid gear, the flexible gear, and the wave generator are assembled;
an output shaft coaxially fixed to the rigid boss of the flexible gear;
a first bearing that is disposed between the housing and the output shaft and that supports the output shaft in a state that allows rotation with respect to the housing; and
a second bearing that is disposed between the housing and the rigid cam plate of the wave generator and that supports the rigid cam plate in the axial direction in a state that allows rotation with respect to the housing.

7. The flat strain wave gearing according to claim 6, wherein the first bearing has:
an outer-ring raceway surface formed on a circular inner peripheral surface of the rigid gear that is fixed coaxially to the housing;
an inner-ring raceway surface formed on a circular outer peripheral surface of the output shaft; and
rolling elements that are accommodated in a rollable state between the outer-ring raceway surface and the inner-ring raceway surface.

* * * * *